Nov. 17, 1964 R. W. OSIER 3,157,160
AUTOMATIC CHICK WATERER
Filed Dec. 30, 1963
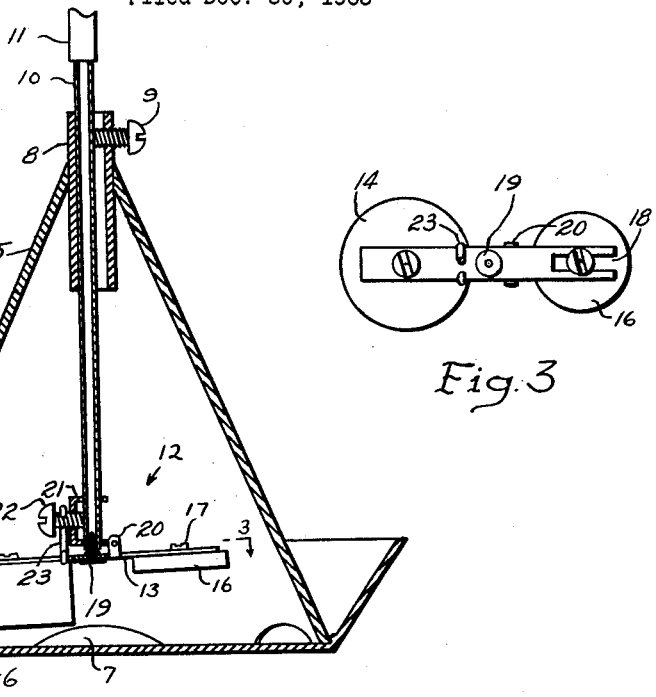
Fig. 1
Fig. 3
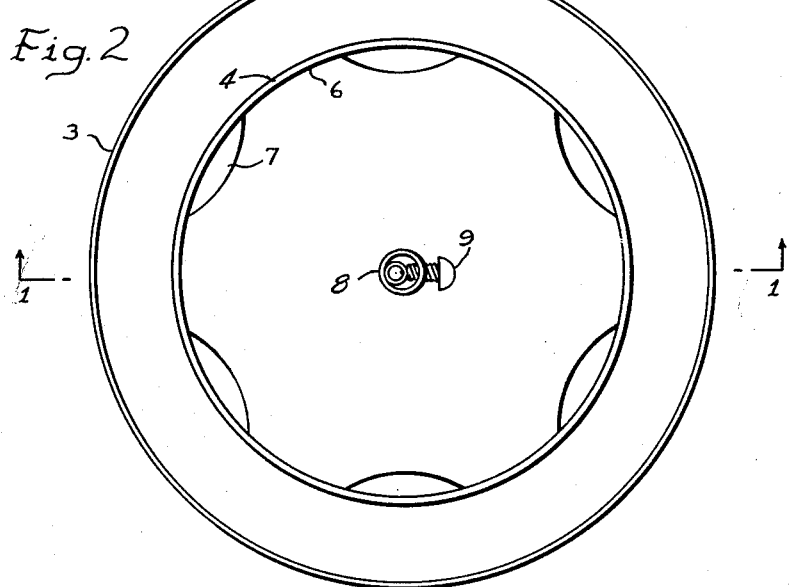
Fig. 2
INVENTOR.
Richard W. Osier
BY Theodore L. Brown
Attorney

United States Patent Office 3,157,160
Patented Nov. 17, 1964

3,157,160
AUTOMATIC CHICK WATERER
Richard W. Osier, R.F.D. 4, Waldoboro, Maine
Filed Dec. 30, 1963, Ser. No. 334,464
3 Claims. (Cl. 119—79)

This invention relates in general to a poultry waterer, and more particularly concerns a chick waterer automatically providing a constant level of drinking water.

It is an object of this invention to provide a drinking fountain for baby chicks for their first two weeks, replacing the jug waterers commonly used at that stage of chick development, although the device in different sizes is useful for larger poultry.

It is a further object of this invention to provide a waterer of simple, inexpensive, durable construction that is easy to clean and maintain, and that guards the chicks against drowning and reduces the possibility of their getting into the water and contaminating it with litter from their feet and the like.

In particular, it is an object of this invention to provide a chick waterer that has novel automatic valve means adjustable to maintain any desired water level in the device.

More particularly, it is an object of this invention to provide an automatic waterer having a resilient valve element that throttles down the flow of water from an average water supply system, and that is automatically actuated by a float and counterbalance weight to shut off the water when the predetermined water level is obtained, the entire valve and float system being adjustably supported to enable setting the water level at any height desired.

These and further objects and advantages will be more readily apparent from the accompanying specification and drawings, in which:

FIGURE 1 is a side sectional view of a preferred form of the invention along line 1—1 of FIGURE 2, in section except for some of the valve components;

FIGURE 2 is a top plan view of the device of FIGURE 1; and

FIGURE 3 is a view along line 3—3 of FIGURE 1 showing details of the valve and float system.

Referring to the drawings, the waterer comprises a shallow circular pan 1 having a flat bottom 2 and a peripheral side wall or rim 3 extending up at an angle therefrom, with a bead 4 inside the rim extending slightly over the lower edge of the base of the cover cone 5 for holding the cone in a snap fit, the cone being detachable for cleaning the pan or repairing the valve after long use. The cover lower base edge 6 preferably has apertures in the form of scallops 7 above bead 4 to permit water to flow from inside the cone to the circular trough between the cone outer surface and rim 3. In a slightly different form the cone base may be continuous, with the pan fluted to provide water-passing apertures by means of the flutes, in the rim 3 or bottom 2. Either form will provide the necessary apertures at the base permitting water to pass therethrough.

The cover inwardly tapers to an upper apex, at which upper end is a cylindrical pipe 8 with screw 9 for holding conduit or tube 10 in adjusted vertical position. The pipe extends down into the cone for greater length to provide stability to the positioning of conduit 10, and the pipe is of larger inside diameter than the outside of the conduit tube to provide a small passageway for air to flow out of the cone as the water level initially rises, and to flow in or out as the level changes slightly during operation. Tube 10 is fed with water from plastic tubing 11 connected to a water supply at desired pressure, which in average systems runs from about forty to sixty pounds pressure. After loosening screw 9 the tube 10 may be raised or lowered, to respectively raise or lower the valve system attached at its lower end and thus to raise or lower the level of water in the pan 1 including the trough space from which the chicks drink, without dismantling the device.

At the lower open end of tube 10 is the valve 12. In the preferred form shown this comprises a substantially horizontal flat strip 13 pivotally attached at one side of and spaced slightly below and transversely of the lower end of conduit 10. Strip 13 has attached at one end a float 14 held thereto as by screw 15, and at the other end a counterbalance weight 16 held as by screw 17 adjustably positioned at the proper location along slot 18 in the strip 13. The location of the weight is chosen to act in concert with float 14 to counteract the water pressure and cut it off when the desired water level is obtained. Through the center of strip 13 passes a rubber valve seat 19 having a conical portion coacting with the lower end of tube 10 to stop the flow of water as desired. The seat 19 has a narrow stem portion extending up into the tube to throttle down the flow of water, and tube 10 has its lower end sharp, as by cutting it off with a tubing cutter, to provide an inner edge biting into the rubber in closed position.

Strip 13 has two ears 20 extending up therefrom, in which one end of U-shaped bracket 21 is pivoted. Tube 10 passes down through each leg of bracket 21, and the bight portion of the bracket has threaded therein a screw 22 for holding the bracket and thus the overall valve 12 in correct position so that rubber seat 19 will fully stop the flow of water properly. If desired, a wire clip 23 may extend from strip 13 over the head end of screw 22, to prevent the valve from flopping against tube 10 if inverted. The upper end of clip 23 is U-shaped and short enough to be pulled sideways to disengage from the screw, to permit the strip to be swung away from the tube end for replacement of valve seat 19 if necessary.

The pan, cone, tube, strip and bracket may be of any suitable material such as metal, but many of those components such as the pan and cone preferably are of durable molded plastic for ease of manufacture and to reduce the cost. The float may be of closed cell plastic foam such as styrofoam, and the weight may be lead. The entire assembly is light in weight for easy distribution at the watering stations, and the components may be readily snapped apart and disassembled for cleaning and maintenance such as adjustment or replacement of parts.

Cone 5 is tapered at an angle convenient to be grasped by the hand for carrying or disassembly, and coacts with rim 3 of the pan at a proper angle to provide a trough wide enough and low enough for the chicks to drink from conveniently but too narrow for the chicks to bathe or drown in the water. The cone covers the valve to protect it from the chicks and litter. The mass of water, together with the wide flat pan containing it, provides a very stable unit with a low center of gravity. If the device is accidentally kicked or tipped, the cone by containing most of the water minimizes sloshing on the litter.

The float and weight components of valve 12 have clearance from them to the cone so that the cone will not interfere with the valve operation. The snap fit between the cone and pan provides a rigid overall unit not disengageable by the chicks or by carrying it from one position to another, yet which can be readily opened when desired. Having the valve system attached to the cone rather than to the pan not only permits easy adjustment of its vertical location but also enables the pan, which is the component requiring the most cleaning and subject to the most wear and possible destruction on the floor, to be of very simple construction easily cleaned or replaced at small expense.

In a minor variation the pan could be square or rectangular and the cover a corresponding square- or rectangular-based pyramid. Many other modifications will be apparent to the artisan; however, the invention is to be limited only by the scope of the following claims.

I claim:

1. An automatic waterer comprising a shallow horizontal pan having a flat bottom and an upstanding peripheral rim, an upwardly extending cover inwardly tapered to an upper apex and having a base seated within the rim of the pan and retained by a bead with apertures at said base permitting water to pass therethrough from inside to outside of the cover, the apex having a vertically-extending pipe therein, a rigid water supply conduit adjustably contained in said pipe and extending substantially vertically down through the cover apex toward the bottom of the cover adjacent the pan and having an open lower end, and a water throttling and shut-off valve attached to the lower end of said conduit; said valve comprising a substantially horizontal straight member pivotally attached at one side of and spaced slightly below and transversely of the conduit lower end, a resilient valve seat on said member directly below said open lower end of the conduit, and a float on the end of said member on the other side of the conduit from the pivotal attachment.

2. A waterer as in claim 1 wherein the valve seat includes a conical portion for abutting against the end of the conduit to shut off the water, and a narrow portion extending up into the conduit for throttling down the flow of water before shut-off.

3. A waterer as in claim 1 wherein the valve further comprises a bracket adjustably attached to the conduit lower end, with said straight member pivotally attached to said bracket and thus to the conduit lower end, the bracket being adjustable along the conduit to permit adjustment of the seating of the valve seat against the conduit lower end.

References Cited by the Examiner
UNITED STATES PATENTS

| | | | |
|---|---|---|---|
| 1,103,413 | 7/14 | Hasty | 119—80 |
| 1,961,092 | 5/34 | Smith | 119—80 |
| 2,584,383 | 2/52 | Feck | 119—74 X |
| 2,821,167 | 1/58 | Gilbertson | 119—81 |
| 3,063,417 | 11/62 | Blosser | 119—79 |

SAMUEL KOREN, *Primary Examiner.*

HUGH R. CHAMBLEE, *Examiner.*